A. RITCHIE.
Rotary Measure.

No. 218,065.　　　　　Patented July 29, 1879.

Witnesses
W. Floyd Duckett
W. F. Clark

Inventor
Alexander Ritchie
per J. L. Boone
Attorney

UNITED STATES PATENT OFFICE.

ALEXANDER RITCHIE, OF SAN FRANCISCO, CALIFORNIA.

IMPROVEMENT IN ROTARY MEASURES.

Specification forming part of Letters Patent No. 218,065, dated July 29, 1879; application filed February 5, 1879.

*To all whom it may concern:*

Be it known that I, ALEXANDER RITCHIE, of the city and county of San Francisco, and State of California, have invented an Improved Carpenter's and Builder's Measuring Implement; and I do hereby declare that the following is a full, clear, and exact description thereof, reference being had to the drawings accompanying this specification and forming a part of the same.

My invention relates to an implement for measuring lines that have been drawn to a scale and indicating the full number of feet represented by the line.

My measuring implement is intended more particularly for the use of carpenters, builders, architects, and engineers for determining mechanically the full proportions of scale-drawings without resorting to mathematical calculations. I also combine with my implement a table for simultaneously determining the number of joists or studding required for any given number of feet, all as hereinafter described.

Figure 1:
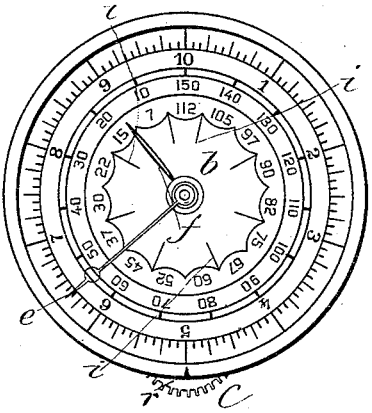
Figure 2:
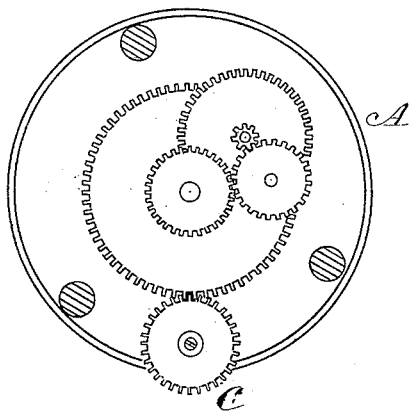

Referring to the accompanying drawings, Figure 1 shows the dial and its divisions. Fig. 2 shows the internal mechanism of the measuring implement.

A represents a metallic or other case, similar to the case of a watch, and provided with a glass-covered face or dial, $b$, on one side. This face or dial I provide with two or more concentric circles or spaces. The outside circle is divided into ten equal divisions, and the divisions are numbered from 1 to 10, in the manner of numbering the divisions on the face of a watch, and the space between each two figures is divided by graduations into twelve equal parts, representing inches. The next inside space is divided into fifteen spaces or divisions, commencing by tens, progressively around the circle.

Inside of the case A, I arrange a train of gears, which is actuated by a friction-wheel, C, the edge of which projects through the edge of the case A, so that it can be pressed upon and made to rotate by moving the case over the surface to be measured.

Upon the center-post of the implement I place a long hand, $e$, which is moved around by a train of gears like the minute-hand of a watch, and points to the outside circle of figures. Upon the tubular or outside center-post I place a short hand, $f$, which points to the inside circle of figures and moves only one-tenth as fast as the outside hand, so that for every complete rotation of the pointer $e$, the pointer or hand $f$ is moved from one number to the other in the second circle, so that it records the number of spaces moved over by the long hand or pointer.

The traction-wheel and train of gears contained in each implement are made to speed the movement of the hands, according to the scale it is intended to calculate, and this can be done by any competent manufacturer of this class of gears. Now, supposing, for example, that the traction-wheel will move over the distance of one inch in making an entire revolution, and that a single revolution of the traction-wheel will carry the long pointer $e$ from the figure 1 to the figure 5, and move the short hand a corresponding distance on the inner circle, the implement will then indicate one foot for each one-fourth of an inch on the line over which it is passed, or will be adapted for calculating the length of a line drawn on a scale of one-quarter of an inch to the foot.

The traction-wheel C, which I employ, is a toothed wheel of the train, which is made to project from the rim of the case, so as to bear upon the surface to be measured.

Inside of the second circle of figures I also make another circle of figures, as represented. The spaces in this circle correspond with the spaces of the second circle, and in this circle, opposite the figures in the second circle, I place figures which represent the number of rafters, studding, or joists required for the number of feet indicated by the figures in the second circle. Inside of this third circle I mark off at regular intervals seven spaces by means of radial lines $i$, representing the number of rafters, studding, or joists to be used in every ten feet.

Now, for example, if the line to be measured is twenty inches long, and is drawn to a scale of one-quarter of an inch to the foot, I first adjust the hands of the implement so that the long hand points to the figure 10 on the outside circle and the short hand points to the figure 150 on the second circle, which in this instance represents zero. The case A has a mark, r, opposite the middle of the traction-wheel, to serve as a guide in starting and stopping the movement of the implement. I then place the traction-wheel C upon the surface to be measured so that the mark r is just above the end of the line. I then move the instrument along the line, pressing upon it sufficiently to cause the traction-wheel to rotate and drive the train of gears. When the instrument has been moved along the line until the mark r is even with its opposite end, I raise the implement, and upon examining the dial I find that the short hand points to the figure 80 in the second circle and 60 in the third or inner circle. This indicates that the line represents eighty feet in length, and that sixty rafters, studding, or joists, set at sixteen inches from center to center, are contained therein.

To find the number of joists contained in any number of feet less than ten, or if the short hand should stop between two of the numbers marked on the two inner circles, I find the number of feet indicated by the intermediate position of the hand by counting from the figure 150 around the outer circle and ending at the position occupied by the hand. This number I then add to the whole number last passed over by the hand, which gives the exact number of feet and inches. The intermediate number of rafters, joists, or studding is found by counting on the inner circle from the same point, and adding the number thus found to the last number indicated by the short hand.

A carpenter, architect, or builder can thus calculate the size of every part of a house or structure from scale-drawings mechanically and correctly without trouble.

The instrument can be moved in straight or curved lines, and will record correctly in either case. It will therefore be convenient for calculating the number of feet of water or gas pipe, or other running material used in the construction of buildings.

Having thus described my invention, I claim, and desire to secure by Letters Patent, is—

The measuring-instrument herein described, consisting of the case A, having the guide-mark r opposite the center of the traction-wheel C, and dial-face provided with hands b e and three graduated concentric circles or curves, the two outer ones indicating feet, and the inner graduated one having radial lines i, indicating the number of beams contained within the distance indicated by the longer hand and the distances between their centers, said instrument being provided with a train of gear-wheels inside the case, actuated by the spur traction-wheel C, having its edge projecting from the rim of the case, substantially as described, and for the purpose set forth.

In witness whereof I hereunto set my hand and seal.

ALEXANDER RITCHIE. [L. S.]

Witnesses:
WM. FLOYD DUCKETT,
W. F. CLARK.